3,168,512
CHROMIFEROUS AZO DYESTUFFS CONTAINING AN 8-HYDROXYQUINOLINE RADICAL
Arthur Buehler, Rheinfelden, Switzerland, and Gerhard Back, Loerrach, Germany, assignors to Ciba Limited, Basel, Switzerland, a company of Switzerland
No Drawing. Filed Apr. 10, 1961, Ser. No. 101,667
Claims priority, application Switzerland, Apr. 11, 1960, 4,078/60; Mar. 16, 1961, 3,179/61
8 Claims. (Cl. 260—146)

The present invention is based on the observation that new, valuable chromiferous azo dyestuffs are obtained by reacting in the molecular ratio of about 1:1 an 8-hydroxyquinoline which may contain a sulfonic acid group with a complex chromium compound of an ortho:ortho'-dihydroxy-ortho-carboxy - ortho' - hydroxy-, ortho - carboxyortho'-amono- or ortho-hydroxy-ortho'-aminoazo- or azomethine-dyestuff containing one or more sulfonic acid or carboxylic acid groups and per molecule of dyestuff one atom of chromium bound in complex union.

As 8-hydroxyquinolines there are suitable compounds that are free from, or contain, sulfonic acid groups, for example 6:8-dihydroxyquinoline, 5-chloro-8-hydroxyquinoline, 8-hydroxyquinoline-7-sulfonic acid and above all 8-hydroxy quinoline itself.

The monoazo dyestuffs containing one or more sulfonic acid groups to be used in the present process in the form of their 1:1-chromium complexes can be prepared in known manner by coupling an ortho-hydroxydiazo or ortho-carboxy-diazo compound, primarily such as belong to the benzene or naphthalene series, with coupling components capable of coupling in ortho-position to an amino or hydroxyl group. The 1:1-chromium complex compounds to be used may contain a wide variety of nonionic substituents such as chlorine atoms, or nitro, alkyl, alkoxy, alkylsulfoxide, alkylsulfone, sulfonamide or acylamino groups. Particularly valuable results are achieved with the 1:1-chromium complex compounds of ortho-hydroxy-ortho'-amino-azo dyestuffs of the benzeneazonaphthalene series containing one or more sulfonic acid groups whose benzene nucleus contains a nitro group, furthermore 1:1-chromium complex compounds of monoazo dyestuffs containing as diazo component a 4-chloro-2-aminophenol-6-sulfonic acid or a 2-hydroxy-1-amino-naphthalene-4-sulfonic acid.

For the manufacture of monoazo dyestuffs whose 1:1-chromium complex compounds are used as starting materials the diazo compounds of the undermentioned amines—more especially such as contain a nitro group—can be coupled, for example, with the following coupling components capable of coupling in a vicinal position to the amino or hydroxyl group respectively:

2-aminonaphthalene,
2-amino-6-alkoxynaphthalene,
2-aminonaphthalene-6-sulfonic acid morpholide,
2-aminonaphthalene-6-sulfonic acid-N-methyl-,
 -ethyl-, isopropyl-, -β-hydroxyethyl- or methoxypropylamide,
2-aminonaphthalene-6-sulfonic acid anilide,
2-aminonaphthalene-6-sulfonic acid-N-methylanilide,
1-aminonaphthalene-3-, -4- or -5-sulfonamides,
1-aminonaphthalene-5-methyl- or -ethylsulfone,
2-aminonaphthalene-6-sulfonic acid phenyl ester,
5:8-dichloro-1-aminonaphthalene,
2-phenylaminonaphthalene,
2-phenylamino-naphthalenesulfonamides,
2-(3'-chlorophenylamino)-naphthalenesulfonamides,
2-(sulfonamido)-phenylaminonapthalenes,
2-hydroxynaphthalene,
1-hydroxy-5:8-dichloronaphthalene,
1-hydroxy-7-acylaminonaphthalenes,
furthermore naphthylamines containing sulfonic acid groups or carboxylic acid groups such as 1-aminonaphthalene-3-, -4- or -5-sulfonic acid,
2-aminonaphthalene-4-, -5-, -6-, -7- or -8-sulfonic acid,
1-aminonaphthalene-3:6-disulfonic acid,
2-, 3- or 4-sulfophenylaminonaphthalenes,
2-, 3- or 4-carboxyphenylaminonaphthalenes and the like,
2-amino-3-naphthoic acid,
1-hydroxynaphthalene-4-, -5- or -8-sulfonic acid,
1-hydroxy-8-acylaminonaphthalene-3:6-disulfonic acids,
1-hydroxy-8-acylaminonaphthalene-5-sulfonic acids,
1:7-dihydroxynaphthalene-3-sulfonic acid,
2-hydroxynaphthalene-6-sulfonic acid,
2-hydroxynaphthalene-3:6-disulfonic acid, as well as compounds capable of coupling in vicinal position to an enolized keto group such as 5-pyrazolones, for example:

1-phenyl-3-methyl-5-pyrazolone,
1-phenyl-3-methyl-5-pyrazolone-3'- or -4'-sulfonic acid,
1-(2'-methyl-6'-chlorophenyl)-3-methyl-5-pyrazolone,
1-(2':5'-dichlorophenyl)-3-methyl-5-pyrazolone-4'-sulfonic acid, or acetoacetic acid amides, more especially acetoacetic acid arylides.

As examples of suitable diazo compounds there may be mentioned those of the following amines:

3:4:6-trichloro-2-amino-1-hydroxybenzene,
4:6-dichloro-2-amino-1-hydroxybenzene,
4- or 5-chloro-2-amino-1-hydroxybenzene,
2-amino-1-hydroxybenzene-4- or -5-sulfonamides and -sulfones,
2-amino-1-hydroxybenzene-4- or -5-sulfonic acid,
4-chloro-2-amino-1-hydroxybenzene-6-sulfonic acid, and more especially compounds containing nitro groups such as 4- or 5-nitro-2-amino-1-hydroxybenzene,
4-chloro-5- or -6-nitro-2-amino-1-hydroxybenzene,
4-nitro-6-chloro-2-amino-1-hydroxybenzene,
6-nitro-4-methyl-2-amino-1-hydroxybenzene,
4-nitro-6-acetylamino-2-amino-1-hydroxybenzene,
6-nitro-4-acetylamino-2-amino-1-hydroxybenzene,
4:6-dinitro-2-amino-1-hydroxybenzene,
4-nitro-2-amino-1-hydroxybenzene-5- or -6-methylsulfone,
6-nitro-2-hydroxy-1-aminonaphthalene-4-sulfonic acid,
4-nitro-2-amino-1-hydroxybenzene-5- or -6-sulfonic acid,
6-nitro-2-amino-1-hydroxybenzene-4-sulfonic acid,
2-hydroxy-1-aminonaphthalene-4-sulfonic acid,
2-hydroxy-6-nitro-1-aminonaphthalene-4-sulfonic acid,
furthermore
anthranilic acid.

The components to be coupled must always be selected so that the monoazo dyestuff contains at least one sulfonic acid group. The azomethine dyestuffs which are likewise suitable as starting materials for the present process can be manufactured by known methods.

In other respects, the 1:1-complexes used as starting materials in the present process may be manufactured by any desired known method, for example by reacting a metallizable monoazo dyestuff or azomethine dyestuff that is free from complex-forming metal in an organic medium, (for example in a water-miscible medium such as pyridine, formamide, dioxane or the like) or in an aqueous acid medium with an excess of a salt of trivalent chromium such as chromium acetate, chromium formate, chromium chloride, chromium sulfate or chromium fluoride at the boil or preferably at a temperature exceeding 110° C.

The reaction according to the present invention of the

1:1-chromium complex with the 8-hydroxyquinoline is carried out in an organic medium or in an aqueous medium of weakly acid, neutral to alkaline reaction, under atmospheric or superatmospheric pressure, at room temperature or an elevated temperature, for example at a temperature ranging from 50 to 120° C. In general it is advisable to use for the reaction as far as possible equivalent proportions of the metalliferous 1:1-complex and of the 8-hydroxy-quinoline.

As an alternative to preparing first the 1:1-chromium complex compounds the products obtained by the present process may be made by chroming the metallizable monoazo dyestuff or azomethine dyestuff in the presence of a hydroxy-quinoline compound.

According to another variant of the present process the chromium complex is first made from one atomic proportion of chromium, one molecular proportion of one of the aforementioned monoazo dyestuffs and one molecular proportion of an organic compound capable of forming chromium complexes but which is not a dyestuff whereupon in said chromium complex the complex-forming organic compound is replaced by an 8-hydroxyquinoline. As such compounds that are capable of forming complexes but posses no dyestuff character there may be used, for example, aromatic compounds containing hydroxyl groups and/or carboxyl or sulfonic acid groups such as 1:2-dihydroxybenzene, ortho- or peri-dihydroxy-naphthalenes, ortho-hydroxynaphthoic acids, phthalic acid and derivatives thereof and more especially salicylic acid, furthermore pyridinesulfonic or carboxylic acids, oxalic, tartaric, citric or malic acid, polyglycols or ethanolamines.

The chromiferous monoazo and azomethine dyestuffs obtained by the present process or one of its variants are new; they are surprisingly stable and are suitable for dyeing or printing a wide variety of materials, above all for dyeing animal materials such as silk, leather and more especially wool, and are also suitable for dyeing or printing synthetic fibers of superpolyamides or superpolyurethanes. They can be used for dyeing nitrogenous fibers such as wool, for example from a bath of acetic acid to neutral reaction, if desired with addition of the assistants conventionally used in dyeing, for example with addition of compounds containing at least one basic nitrogen atom to which is bound at least one residue containing a polyglycol ether chain, the molecule containing at least three

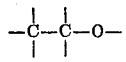

groups (preferably —CH$_2$—CH$_2$—O— groups) and at least four carbon atoms not belonging to such a group, for example with addition of a nitrogen compound of the formula

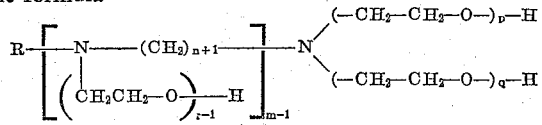

where R represents a preferably unbranched aliphatic hydrocarbon radical containing at least 12, preferably 16 to 22, carbon atoms; $m$ and $n=1$ or 2; $p$, $q$ and $r$ are whole numbers, the sum $p+q+(m-1)(r-1)$ being at least 3 and preferably from 6 to 20.

Furthermore, nitrogenous fibers, more especially wool, can be dyed in an advantageous manner with dyestuffs obtained by the present process by applying to the fiber, advantageously continuously, for example on a padder, an aqueous preparation containing a wool dyestuff and an assistant capable of forming with water and if desired with additives a system which consists of two liquid phases and displays a mixture gap, the ratio of water (if desired containing additives) to the assistant being within at the proximity of the mixture gap, the mixture gap appearing already at a relatively low content of assistant, and the phase richer in assistant making up a substantial share of the mixture within a wide range of the mixture gap, the fiber material impregnated with the aqueous preparation then being subjected to a heat treatment.

A group of compounds that satisfies the abovementioned conditions and is preferably used in performing the present process includes hydrophilic, more especially surfactive substances forming colloidal solutions and capable of coacervation.

As examples of assistants that satisfy the above-mentioned requirements and are capable of coacervation, and are therefore particularly suitable for the process described above, there may be mentioned the reaction products of higher fatty acids with hydroxyalkylamines, and if desired with ethylene oxide. It is possible for example, to manufacture such products without using ethylene oxide from higher fatty acids, preferably such as contain about 12 carbon atoms, and hydroxyalkylamines such as triethanolamine or preferably diethanolamine, the reaction taking a course such that the molecular ratio of hydroxyalkylamine to fatty acid is greater than unity, being, for example, about 2:1.

The fiber impregnated with the two-phase system is then subjected to thermofixation, generally performed with steam or in exceptional cases with dry heat.

The heat-treated material must then be cleaned to remove any excess dyestuff, thickener and residual assistant. As a rule this cleaning takes the form of a treatment in a heated bath containing a surfactive detergent, if desired in the presence of ammonia or of an acid.

As a rule, dyeings and prints obtained with the new dyestuffs are distinguished by their levelness, the purity of their tints, by good fastness to light and good fastness to abrasion; in general their appearance in artificial light hardly changes at all and some of them have very pleasing and valuable shades.

Unless otherwise indicated, parts and percentages in the following examples, which illustrate the invention, are by weight. The relationship between parts by weight and parts by volume is the same as that between the gram and cm.$^3$.

EXAMPLE 1

37.4 parts of the 1:1-chromium complex of the dyestuff from diazotized 1-hydroxy-2-amino-5-nitrobenzene and 2-naphthylamine-6-sulfonic acid, with the addition of 50 parts of N-sodium hydroxide solution in 500 parts of water heated at about 50° C., are stirred until a clear solution forms. A solution cleared by filtration and heated to about 50° C., of 22.7 parts of 8-hydroxyquinoline-7-sulfonic acid in 200 parts of water and 50 parts of N-sodium hydroxide solution are then added and the reaction mixture is heated to 90 to 95° C. while being stirred. During the stirring the solution changes color from greenish blue to pure green. In completion of the reaction the whole is filtered, if desired with the aid of a filter assistant such as Celit, carbon or the like. The dyestuff formed is salted out with sodium chloride, filtered off and dried in vacuum at 95° C. The resulting dyestuff is soluble in water with pure green coloration and in concentrated sulfuric acid with red-violet coloration and yields by the process described above on wool pure, bluish green dyeings.

A similar dyestuff is obtained when the 1:1-chromium complex dyestuff is reacted with 14.8 parts of 8-hydroxyquinoline instead of with 8-hydroxyquinoline-7-sulfonic acid.

EXAMPLE 2

32.0 parts of the monoazo dyestuff from diazotized 1-hydroxy-2-amino-5-nitrobenzene and 2-naphthylamine-6-sulfonic acid, 14.8 parts of 8-hydroxyquinoline, 18.4 parts of chromium-III-formate, 16.8 parts of sodium bicarbonate and 500 parts of formamide are heated with stirring for a few hours at 130 to 135° C. until the parent dyestuff can no longer be detected. The reaction mixture changes color from bluish red to blue-green. The complex formed is isolated by pouring the reaction mixture into 3000 parts of a solution of sodium chloride of 20% strength heated to about 60° C. The whole is stirred for some time and then filtered and the filter cake is washed with sodium chloride solution of 20% strength and then dried in vacuum at 95° C. The properties of the resulting dyestuff correspond to those of the dyestuff mentioned at the end of Example 1.

The reaction of the metal-free components may alternatively be carried out in an aqueous suspension of weakly acid to alkaline reaction at an elevated temperature and under superatmospheric pressure.

EXAMPLES 3 TO 39

When the 1:1-chromium complexes of the monoazo dyestuffs listed in column I of the following table are reacted with the colorless complex-formers shown in column II by the process described in Example 1, there are obtained further dyestuffs of similar properties which produce on wool the shades listed in column III.

| | I | II | III |
|---|---|---|---|
| 3 | $O_2N$-[OH / NO$_2$]-N=N-[NH$_2$ / SO$_3$H naphthyl] | 8-hydroxyquinoline | Green. |
| 4 | $HO_3S$-[OH / NO$_2$]-N=N-[naphthyl] | $HO_3S$-8-hydroxyquinoline-OH | Olive green. |
| 5 | $O_2N$-[OH]-N=N-[NH$_2$ / SO$_3$H naphthyl] | HO-quinoline-OH | Green. |
| 6 | $O_2N$-[OH]-N=N-[NH$_2$ / SO$_3$H naphthyl] | Br-quinoline-Br-OH | Do. |
| 7 | $O_2N$-[OH]-N=N-[NH$_2$ / SO$_3$H naphthyl] | Cl-quinoline-OH | Do. |
| 8 | $O_2N$-[OH]-N=N-[H$_2$N / COOH / naphthyl] | $HO_3S$-quinoline-OH | Do. |
| 9 | $O_2N$-[OH]-N=N-[NH$_2$ / naphthyl-SO$_3$H] | quinoline-OH | Do. |
| 10 | $O_2N$-[OH / NO$_2$]-N=N-[H$_2$N / naphthyl-SO$_3$H] | quinoline-OH | Do. |
| 11 | [OH / NO$_2$]-N=N-[H$_2$N / naphthyl-SO$_3$H] | quinoline-OH | Olive. |

| | I | II | III |
|---|---|---|---|
| 12 | 2-hydroxy-4-nitrophenyl azo coupled to anilino-naphthalene sulfonic acid | 8-hydroxyquinoline | Green. |
| 13 | 2-hydroxy-4-nitrophenyl azo coupled to amino-naphthalene sulfonic acid (HO₃S) | 8-hydroxyquinoline | Blue-green. |
| 14 | 2-hydroxy-4-nitrophenyl azo coupled to amino-naphthalene sulfonic acid | 8-hydroxyquinoline | Green. |
| 15 | 2-hydroxy-5-sulfophenyl azo coupled to aminonaphthalene | 8-hydroxyquinoline | Yellowish green. |
| 16 | HO₃S, 4-nitro-2-hydroxyphenyl azo coupled to aminonaphthalene | 8-hydroxyquinoline | Green. |
| 17 | HO₃S, 4-chloro-2-hydroxyphenyl azo coupled to aminonaphthalene | 8-hydroxyquinoline | Do. |
| 18 | HO₃S-hydroxynaphthyl azo coupled to dichloro-hydroxynaphthalene | 8-hydroxyquinoline | Green-blue. |
| 19 | HO₃S-4-nitro-2-hydroxyphenyl azo coupled to 1-phenyl-3-methyl-5-pyrazolone | 8-hydroxyquinoline | Orange. |
| 20 | 4-chloro-2-hydroxyphenyl azo coupled to dihydroxynaphthalene sulfonic acid | 8-hydroxyquinoline | Grey. |
| 21 | HO₃S-5-nitro-2-hydroxyphenyl azo coupled to hydroxynaphthalene | 8-hydroxyquinoline | Black. |

| | I | II | III |
|---|---|---|---|
| 22 | 4-nitro-6-sulfo-2-hydroxyphenyl azo 1-hydroxynaphthalene | 8-hydroxyquinoline | Grey-violet. |
| 23 | 4-chloro-2-hydroxyphenyl azo 2-hydroxy-6-sulfonaphthalene | 8-hydroxyquinoline | Violet. |
| 24 | 5-chloro-3-sulfo-2-hydroxyphenyl azo 1-hydroxynaphthalene | 8-hydroxyquinoline | Grey-blue. |
| 25 | 6-sulfo-2-hydroxynaphthyl azo 1-phenyl-3-methyl-5-hydroxypyrazole | 8-hydroxyquinoline | Blue-red. |
| 26 | 2-carboxyphenyl azo 1-(3-sulfophenyl)-3-methyl-5-hydroxypyrazole | 8-hydroxyquinoline | Yellow. |
| 27 | 4-sulfo-1-hydroxynaphthyl azo 1-hydroxynaphthalene | 8-hydroxyquinoline | Blue. |
| 28 | 3,5-dichloro-2-hydroxyphenyl azo 4-acetylamino-8-sulfo-1-hydroxynaphthalene | 8-hydroxyquinoline | Do. |
| 29 | 4-chloro-6-sulfo-2-hydroxyphenyl azo 1-phenyl-3-methyl-5-hydroxypyrazole | 8-hydroxyquinoline | Red. |
| 30 | 4-sulfo-1-hydroxynaphthyl azo 3-sulfo-2-hydroxynaphthalene | 8-hydroxyquinoline | Green-blue. |
| 31 | 4-sulfo-1-hydroxynaphthyl azo 4-sulfo-1-hydroxynaphthalene | 8-hydroxyquinoline | Blue. |

*Note: Column I contains structural diagrams of azo dye compounds with hydroxyl, sulfo, nitro, chloro, carboxyl, and other substituents. Column II shows 8-hydroxyquinoline in each row.*

| | I | II | III |
|---|---|---|---|
| 32 | Cl-C6H2(OH)(NO2)-N=N-C10H5(OH)(SO3H) | 8-hydroxyquinoline | Grey. |
| 33 | HO-C6H3(SO3H)-N=CH-C6H4-OH | 8-hydroxyquinoline | Yellow. |
| 34 | Cl-C6H2(OH)(SO3H)-N=N-C10H5(NH2) | 8-hydroxyquinoline | Olive. |
| 35 | HO-C6H3(NO2)-N=N-C10H4(NH2)(SO3H) | 8-hydroxyquinoline-5-sulfonic acid | Do. |
| 36 | HO-C6H3(NO2)-N=N-C10H4(NH2)(SO3H) | 5-chloro-8-hydroxyquinoline-7-sulfonic acid | Green. |
| 37 | HO-C6H3(NO2)-N=N-C10H4(NH2)(SO3H) | 5,7-diiodo-8-hydroxyquinoline | Do. |
| 38 | HO3S-C6H2(OH)(Cl)-N=N-C6H4-NH-C6H5 | 8-hydroxyquinoline | Do. |
| 39 | HOOC-C6H3(SO3H)-N=N-C10H5(NH2) | 8-hydroxyquinoline | Red-violet. |

*Directions for dyeing knitting wool*

100 parts of knitting wool are immersed in a dyebath containing in 3000 parts of water 5 parts of ammonium sulfate and 1 part of the dyestuff described at the end of Example 1. In the course of ½ hour the bath is raised to the boil and the wool is dyed for another hour at the boil, then rinsed and dried. A level green dyeing is obtained.

*Directions for dyeing woolen fabrics*

100 parts of woollen fabric are immersed at 50 to 60° C. in a dyebath consisting of 3000 parts of water, 5 parts of acetic acid of 40% strength, 10 parts of sodium sulfate, 2 parts of the ethylene oxide adduct prepared as described below and 1 part of the dyestuff described in Example 1. The bath is raised within ½ hour to the boil and the fabric is dyed for another hour at the boil, then rinsed and dried. A level green dyeing is obtained.

*Preparation of the ethylene oxide adduct*

A mixture of 100 parts of commercial oleylamine and 1 part of finely distributed sodium is heated to 140° C., whereupon ethylene oxide is introduced at 135 to 140° C. When the ethylene oxide is being consumed rapidly, the reaction temperature is lowered to 120 to 125° C. and the introduction of ethylene oxide is continued until 113 parts thereof have been taken up. The resulting reaction product gives a substantially clear solution in water.

What is claimed is:

1. A complex chromium compound containing one atom of chromium in complex union with substantially one molecule of a member selected from the group consisting of 8-hydroxyquinoline and 8-hydroxyquinoline-7-sulfonic acid and with substantially one molecule of the monoazo dyestuff sulfonic acid corresponding to the formula

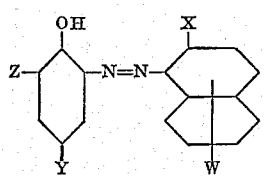

in which Z is a member selected from the group consisting of hydrogen, chlorine, nitro and sulfonic acid, Y is a member selected from the group consisting of chlorine and nitro, X is a member selected from the group consisting of hydroxyl and primary amino and W is a member selected from the group consisting of hydrogen and sulfonic acid.

2. A complex chromium compound containing one atom of chromium in complex union with substantially one molecule of the 8-hydroxyquinoline and with substantially one molecule of the monoazo dyestuff of the formula

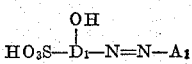

in which $D_1$ represents the radical of naphthalene bound to the azo linkage in vicinal position to the hydroxyl group and $A_1$ is the radical of pyrazolone bound to the azo linkage in 4-position.

3. The complex chromium compound containing one atom of chromium bound in complex union with substantially one molecule of 8-hydroxyquinoline and with substantially one molecule of the monoazo dyestuff of the formula:

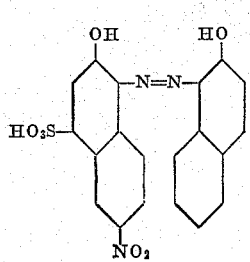

4. The complex chromium compound containing one atom of chromium bound in complex union with substantially one molecule of 8-hydroxyquinoline and with substantially one molecule of the monoazo dyestuff of the formula

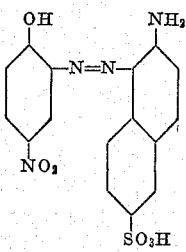

5. The complex chromium compound containing one atom of chromium bound in complex union with substantially one molecule of 8-hydroxyquinoline and with substantially one molecule of the monoazo dyestuff of the formula

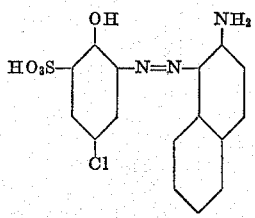

6. The complex chromium compound containing one atom of chromium in complex union with substantially one molecule of 8-hydroxyquinoline and with substantially one molecule of the monoazo dyestuff of the formula

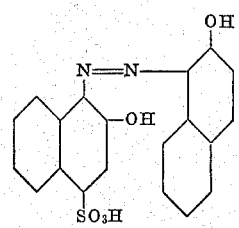

7. The complex chromium compound containing one atom of chromium bound in complex union with substantially one molecule of 8-hydroxyquinoline and with substantially one molecule of the monoazo dyestuff of the formula

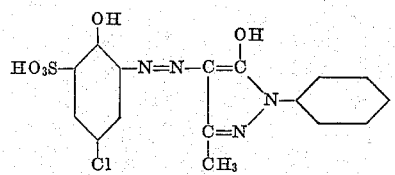

8. The complex chromium compound containing one atom of chromium bound in complex union with substantially one molecule of 8-hydroxyquinoline and with substantially one molecule of the monoazo dyestuff of the formula

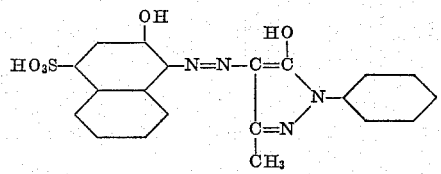

References Cited in the file of this patent
UNITED STATES PATENTS

| | | |
|---|---|---|
| 2,685,595 | Pfitzner et al. | Aug. 3, 1954 |
| 2,708,193 | Pfitzner et al. | May 10, 1955 |
| 2,824,094 | Ackermann et al. | Feb. 18, 1958 |